Patented July 14, 1925.

1,546,156

UNITED STATES PATENT OFFICE.

ADOLF WELTER, OF KREFELD-RHEINHAFEN, GERMANY.

PROCESS FOR PRODUCING FINELY-GRANULATED COMPOUNDS.

No Drawing. Application filed August 13, 1920. Serial No. 403,418.

*To all whom it may concern:*

Be it known that I, ADOLF WELTER, citizen of the German Empire, residing at Krefeld-Rheinhafen, Germany, have invented new and useful Improvements in Processes for Producing Finely-Granulated Compounds, of which the following is a specification.

A process described by me in a previous patent application Serial No. 395,076, filed July 9, 1920, for the production of sodium carbonate containing water of crystallization, or of mixtures thereof, with other substances, consists in steam, water, snow, or hydrous solutions of soap, Glauber's salt, or water-glass being sprayed upon commercial pulverized calcined sodium carbonate or mixtures thereof and in preventing liquefaction or caking by keeping the sodium carbonate in motion, whilst preferably also cooling the same.

I have found that my afore-mentioned process is capable of a general application, inasmuch as sodium carbonate containing water of crystallization or mixtures thereof are not the only products that can be made by it. It may also be employed for converting other salts into fine crystalline substances containing water of crystallization, and during this process any desired suitable chemical changes may be made to take place. More specifically, this process may be used for providing hygroscopic salts, which are apt to decompose when exposed to air, with a protective enveloping layer that appreciably enhances their durability. A particularly important application of the process consists in using it for enveloping oxidizing and reducing agents, which are liable to be affected by the weather or catalyzers, with stabilizers. In using the process it is not necessary to employ apparatus made of metal, as the towers may be made of wood and the nozzles of glass or other suitable materials. In consequence it is precluded that undesired metallic particles or oxides, in particular iron oxide can enter into combination with the chemicals being treated. Such metallic particles or oxides in the presence of sensitive materials being treated might easily exert a catalytic effect and cause decomposition, or such metallic particles or oxides might alternately oxidize and reduce each other by absorbing oxygen from the air and delivering the same to the chemicals. This is avoided by the present process. Another advantage offered by the process is that if the fine division of particles is maintained during the whole process, it is possible to use lower temperatures than hitherto in drying operations, on account of the very considerable increase of the exposed surface. The thus extended process is particularly useful for imparting durability to all so-called per-combinations and to sodium hydrosulphite and similar reducing agents, and for coating finely pulverized substances with water glass or the like. The processes hereinafter described may also be advantageously employed in condensing milk with the aid of sugar or flour, for imparting durability to coffee, or coffee powder, or for similar operations.

I have also found that a specially advantageous manner of carrying out such processes consists in introducing the liquid that is to be inspissated in a finely divided form into the upper part of a tower, and in mixing fine particles of solid substances with the moist vapor thus formed by suction or compressed air, or by mechanical contrivances, and by finally directing air of a lowered or an increased pressure against the falling moistened particles so that the substance arrives at the bottom in a dry and non-caked condition.

To carry out the process in this latter form the particular liquid which is a solvent for the substance to be treated is sprayed in the finest possible particles in the upper part of a tower of any desired material, it being of no consequence how this is done, or whether the spraying device itself is inside or outside of the tower. The fine solid particles that are adapted for absorbing the nebulous spray are then pressed or sucked into the upper part of the tower through lateral holes in the same, or these particles are made to form a dust cloud by mechanical means, when a thorough moistening and an exceedingly great surface formation will occur. The solid moistened particles will now drop down in the tower. On their way to the bottom they will be thoroughly dried by the current of air sucked or pressed through the tower, so that they now will not cake. If the air drawn or pressed out of the top of the tower, should still contain small floating solid particles, these can easily be separated by any preferred kind of filtering devices.

This form of the process permits of very low towers and very brief drying operations being employed. Besides the temperatures used for dessicating may be very low, which is a great advantage in treating bodies which are easily decomposed. This form of the process is also adapted for continuous working and is very economical. The drying operation can be combined with a number of others such as the colouring, impregnating, sugaring, disinfecting or sterilizing of the particular pulverized raw stuffs or substances used.

*Examples.*

1. Crystalline perborate of sodium is sucked or blown into the upper part of a wooden tower of a height of about 30 feet and about 7 to 9 feet in diameter and water-glass solutions of about 30 to 40° B. are squirted through fine spraying nozzles onto the perborate cloud. For better supervision glass windows are provided in the tower. The air current produced in the tower by suction or pressure soon causes the water to evaporate and the particles of perborate coated with a protecting layer of water-glass drop without caking to the bottom of the tower, or the small quantity of them that are carried away by the dessicating current of air can be separated from it by dust chambers. In this way a perborate of sodium powder is obtained each granule of which is coated with a protective layer, and which will keep for an indefinite period. But if perborate of sodium were mixed with a water-glass solution in the ordinary way, a hydrous crystalline paste would result which, before long, will become stiff. It is exceedingly difficult to dry this crystalline paste well enough to render it capable of being ground, even if it is previously broken into fragments. Iron mills would be required for the grinding operation and hence iron would be absorbed which would act as a catalyzer and assist in decomposing the perborate. In the aforedescribed novel process, however, not the slightest amount of oxygen is lost and no iron whatever enters the product.

2. A cloud of fine anhydrous sodium sulfate dust is produced in the upper part of tower built of iron but which, in other respects, is similar to that described in 1. Water is also introduced through a nozzle in the upper part of the tower in a fine spray. The said dust is thus evenly moistened and at the same time it becomes so heavy that it nearly all sinks to the bottom, where it accumulates in the form of fine hydrous crystals of Glauber's salt. Only small quantities of the salt dust are carried along by the air current, which is drawn from the upper part of the tower by a suction device so that the provision of a dust chamber at this part is generally unnecessary. The dust particles accumulate almost without exception in the lower part of the tower, which may be formed in the shape of a sieve through which the air that is drawn away above is continually replaced, whilst the finished product can be conducted away through the sieve in any suitable manner.

3. In a tower of the kind described in 2 a dust cloud of coal-tar dyes melted together with dextrine and afterwards pulverized is formed and sprayed with wood alcohol or ethyl alcohol. The powder dries almost immediately and its unpleasant appearance is changed by its being converted into small shining cantharidian crystals.

I claim:

1. A process for coating finely divided compounds, consisting in spraying fine particles of liquid on fine particles of a solid substance falling downward in a reaction chamber, and subjecting the liquid upon each of said fine particles to evaporation in a current of air.

2. The process of acting upon a solid finely divided substance with a spray of a substance which is a solvent for the solid substance, said process comprising keeping the finely divided substance after its being sprayed upon moving in a downward direction against a current of air thereby evaporating the solvent sprayed upon the fine particles of the granulated substance.

3. A process for forming coatings upon finely divided substances, consisting in spraying the enveloping substance in a solution upon the finely divided solid substance to be coated falling downward in a reaction chamber, and drying each particle of the same while said particles are suspended in the form of a dust cloud thereby evaporating the solvent from said solution.

4. A process for forming coatings on finely divided solid substances by the action of a finely divided solvent of said solid substance, consisting in spraying the solvent in finely divided liquid particles onto the finely divided solid substance falling downward in a reaction chamber, and removing said solvent while said finely divided substance is floating in the form of a dust cloud.

5. A process for rendering solid substances stable, consisting in spraying onto the pulverized solid substance falling downward in a reaction chamber, a stabilizing substance dissolved in a solvent for the pulverized solid substance, drying the solid substance by keeping the same moving during the spraying operation so as to prevent its liquefaction or caking and evaporating said solvent.

6. A process of protecting easily decomposable salts which comprises spraying the solid particles of said salts falling downward in a reaction chamber with a solution of a protective substance, and evaporating the liquid from the protective coatings formed on the particles while said particles are suspended in a gas.

7. A process which consists in introducing a liquid in a finely divided form into the upper part of a treating chamber, mixing finely divided particles of a solid substance with the finely divided liquid particles, and directing air against the falling moistened particles to evaporate at least some of said liquid.

8. A process of treating finely divided solid substances which consists in introducing liquid which is a solvent for the solid substance into the upper part of a treating chamber in finely divided condition, introducing into said chamber finely divided particles of said solid substance so as to be acted upon by the finely divided liquid, and drying the moistened solid particles as they descend in the form of a cloud within said chamber.

9. A process of coating finely divided solid substances which consists in introducing the substance into a treating chamber in the form of a cloud of finely divided particles, subjecting said finely divided particles within said chamber to the action of a solution of a coating substance introduced in the form of finely divided particles, and removing the solvent from said solution by drying so as to leave a substantially dry protective coating upon each particle of said substance.

10. A process of treating solid substances, which consists in introducing the substance in the form of a cloud of finely divided particles into the upper part of a treating chamber, introducing a liquid in the form of a fine spray into said treating chamber to act upon the finely divided particles of said solid substance, and subjecting the treated particles to the action of a current of a gaseous medium.

In testimony whereof I have signed my name to this specification in the presence of two subscribing witnesses.

DR. ADOLF WELTER.

Witnesses:
GUSTAV RAUTER,
LUISE RUPCKE.